(12) United States Patent
Burford (10) Patent No.: US 8,016,179 B2
(45) Date of Patent: Sep. 13, 2011

(54) FRICTION STIR WELDING TOOL HAVING A SCROLL-FREE CONCENTRIC REGION

(75) Inventor: Dwight A. Burford, Park City, KS (US)

(73) Assignee: Wichita State University, Wichita, KS (US)

( * ) Notice: Subject to any disclaimer, the term of this patent is extended or adjusted under 35 U.S.C. 154(b) by 159 days.

(21) Appl. No.: 11/487,814

(22) Filed: Jul. 17, 2006

(65) Prior Publication Data

US 2008/0011810 A1 Jan. 17, 2008

(51) Int. Cl.
*B23K 20/12* (2006.01)
(52) U.S. Cl. ........................................ 228/2.1
(58) Field of Classification Search ............... 228/112.1, 228/2.1
See application file for complete search history.

(56) References Cited

U.S. PATENT DOCUMENTS

| 5,460,317 | A | 10/1995 | Thomas et al. |
| 5,697,544 | A | 12/1997 | Wykes |
| 5,718,366 | A | 2/1998 | Colligan |
| 5,794,835 | A | 8/1998 | Colligan et al. |
| 5,893,507 | A | 4/1999 | Ding et al. |
| 6,053,391 | A | 4/2000 | Heideman et al. |
| 6,138,895 | A | 10/2000 | Oelgoetz et al. |
| 6,227,430 | B1 | 5/2001 | Rosen et al. |
| 6,669,075 | B2 * | 12/2003 | Colligan .......... 228/2.3 |
| 6,676,004 | B1 | 1/2004 | Trapp et al. |
| 6,726,084 | B2 | 4/2004 | Duncan, Jr. |
| 6,758,382 | B1 | 7/2004 | Carter |
| 6,915,939 | B2 * | 7/2005 | Hashimoto et al. ......... 228/2.1 |
| 6,994,242 | B2 * | 2/2006 | Fuller et al. ............. 228/112.1 |
| 7,080,438 | B2 * | 7/2006 | Murakami ................. 29/428 |
| 7,234,626 | B2 * | 6/2007 | Trapp et al. ............ 228/112.1 |
| 2001/0004989 | A1 | 6/2001 | Ezumi et al. |
| 2004/0035914 | A1 | 2/2004 | Hempstead |
| 2004/0155094 | A1 * | 8/2004 | Okamoto et al. ........ 228/112.1 |
| 2004/0195291 | A1 | 10/2004 | Andersson et al. |
| 2005/0001009 | A1 | 1/2005 | Raether et al. |
| 2005/0121497 | A1 | 6/2005 | Fuller et al. |
| 2006/0043152 | A1 * | 3/2006 | Stol et al. ................ 228/2.1 |
| 2006/0086775 | A1 * | 4/2006 | Trapp et al. ............ 228/112.1 |
| 2006/0175382 | A1 * | 8/2006 | Packer et al. ........... 228/112.1 |
| 2006/0289608 | A1 * | 12/2006 | Steel et al. .............. 228/101 |
| 2007/0295781 | A1 * | 12/2007 | Hunt et al. ............... 228/2.1 |
| 2008/0048005 | A1 * | 2/2008 | Forrest et al. ............ 228/101 |
| 2008/0135405 | A1 * | 6/2008 | Hori et al. ............. 204/298.12 |

FOREIGN PATENT DOCUMENTS

JP 2002224859 A * 8/2002
JP 2003094176 A * 4/2003

OTHER PUBLICATIONS

Terry Khaled, *An Outsider Looks at Friction Stir Welding*, Fed. Aviation Admin., Report # ANM-112N-05-06, Jul. 2005.

(Continued)

*Primary Examiner* — Kiley Stoner
*Assistant Examiner* — Carlos Gamino
(74) *Attorney, Agent, or Firm* — Alston & Bird, LLP (57) ABSTRACT

A friction stir welding tool having a shoulder section with a scroll pattern that terminates prior to the edge or boundary of the shoulder section to create a scroll-free concentric surface area.

5 Claims, 6 Drawing Sheets

OTHER PUBLICATIONS

Bakavos, et al.; *Opitmisation of Short Cycle Time Friction Spot Welding of Thin Aluminium Automotive Sheet*; Materials Science Centre, School of Materials, The University of Manchester; pp. 1-9.
Dawes, et al.; *Development of Improved Tool Designs for Friction Stir Welding of Aluminium*; TWI; pp. 1-10.
Burford, et al.; *Advances in Friction Stir Welding for Aerospace Applications*; Airframer; Nov. 2006, pp. 3-7; Issue 14.
Widner, et al.; *An Investigation of the Effects of Tool Design and Welding Parameters on Fatigue Life in Friction Stir Welded 2024-T3*; 7th International Friction Stir Welding Symposium, Awaji Yumebutai Conference Centre, Awaji Island, Japan; May 20-22, 2008 (8 pgs.).
Fuller; *Chapter 2—Friction Stir Tooling: Tool Materials and Designs*; Friction Stir Welding and Processing; 2007; pp. 7-335; ASM Interional®.

* cited by examiner

# FRICTION STIR WELDING TOOL HAVING A SCROLL-FREE CONCENTRIC REGION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to friction welding and, more specifically, to a tool and method for forming joints between workpieces by friction stir welding.

2. Description of Related Art

The general concept of friction stir welding is generally described in U.S. Pat. No. 5,460,317 and "An Outsider Looks at Friction Stir Welding" (Federal Aviation Administration July 2005), both of which are incorporated by reference. Conventional friction stir welding is a process of welding using the frictional heat generated by a non-consumable tool to join workpieces together. The friction stir welding tool includes a pin or probe that is inserted into the joint and a shoulder that is applied against an upper surface of the workpiece. The pin and shoulder rotate to generate friction needed to create a plasticized region along the joint for the welding operation.

For conventional friction stir welding operations, the weld tool shoulder is usually a concave or flat surface that rests against the workpiece. U.S. Pat. No. 6,669,075 also describes a friction stir welding tool having a tapered shoulder. The taper extends from the outer edge of the shoulder downward toward the pin. The '075 patent also describes a tool in which there are multiple concentric shoulder sections tapered at different angles, as well as a tool having an inner flat concentric shoulder section and an outer tapered concentric shoulder section.

Conventional friction stir welding tools have also employed shoulders that contain spiral or concentric grooves. These grooves in the shoulder are commonly known in the friction stir welding art as a "scrolled shoulder." For shoulders comprising a flat surface, the grooves conventionally extend along the entire shoulder surface from the pin toward the outer periphery of the shoulder. For shoulders including one or more shoulder sections, such as those in the '075 Patent, the grooves extend along the entire surface of the shoulder section.

The present invention relates to the surprising discovery that the improved friction weld may be achieved when the scrolled shoulder does not cover the entire shoulder surface. By forming a scroll-free region in the shoulder section, an improved fiction stir weld is achieved. It is theorized that this scroll-free region functions as a "wiper" to wipe the workpiece(s) substantially clean of debris formed during the friction stir welding process and force the debris (or "flash" as it is sometimes called) to the outside of the welding area.

BRIEF SUMMARY OF THE INVENTION

The present is directed to an improved friction stir welding tool for joining workpieces. The tool includes a support body rotable about a first axis, the support body having a first shoulder section with a peripheral boundary. A pin extends from the support body and is rotable about an axis. A scroll pattern is formed in the first shoulder section, but the scroll pattern terminates prior to the peripheral boundary of the first shoulder section to form a scroll-free centric region at the peripheral boundary of the first shoulder section.

In one aspect, the first shoulder section is substantially flat. In another aspect, the first shoulder section is tapered outward such that the taper extends from the peripheral boundary of the first shoulder section toward the pin. In yet another aspect, the first shoulder section is concave in shape. In most cases, there is some curvature to the shoulder surface.

In a further aspect, the tool includes a plurality of shoulder sections. For example, the tools includes a second shoulder section adjacent to the first shoulder section. The second shoulder section is concentric to and is displaced radially from the pin. The first section preferably contains the scroll pattern.

In one aspect, the shoulder includes a substantially flat shoulder section and a shoulder section in which the taper extends downward toward the pin. At least one of the shoulder sections includes a scroll pattern and a region that is scroll-free. Preferably, the substantially flat shoulder section is provided adjacent to the pin, and the tapered section is provided at the outer edge of the support body. The opposite arrangement of shoulder sections may be utilized. In either case, the shoulder section having the scroll pattern and the peripheral region that is scroll-free is most preferably provided on the substantially flat shoulder section.

In still another aspect, the scroll pattern comprises a spiral formed groove or a plurality of concentric grooves.

The depth of the scroll pattern may be uniform or non-uniform (i.e., variable), and may be any suitable depth. In one aspect, the scroll pattern has a depth ranging from about 0.005 to about 0.05 inches, preferably between about 0.01 to 0.02 inches, and even more preferably about 0.015 to 0.017 inches.

The width of the scroll pattern may also be uniform or non-uniform, and may be any suitable width. In one aspect, the scroll pattern has a width ranging from about 0.01 to 0.07 inches, preferably between about 0.02 and 0.05 inches, and most preferably between about 0.025 and 0.04 inches.

In a further aspect, the scroll-free region in the shoulder section preferably comprises about 90, 80, 70, 60, 50, 40, 30, 20, 10, or 5% of the total surface area of the shoulder section. In another aspect, the scroll-free region comprises about 10-95%, 20-80%, 30-70%, or about 40 to 60% of the total surface area of the shoulder section. The remaining shoulder section thus contains no scroll pattern.

In one aspect, the pin and support body are provided as separate components and so that various support body and pin configurations may be utilized together. In another aspect, the support body and pin are integrally formed.

In still another aspect, the support body itself is provided as a multi-component device. For example, the support body may comprise a first support body having a scroll pattern and an outer concentric support body that contains no scroll pattern. In essence, the outer concentric support body operates as a collar around the first support body.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is directed to a friction stir welding tool for joining one or more workpieces together or for friction stir processing (mechanically working) the workpiece material in a localized and controlled matter. As used herein, the term "workpiece" is not meant to be limiting, and it is understood that the workpiece can include one or more structural members, which can be configured in various configurations. Typically, the workpieces are configured to create a lap joint or a butt joint. For example, the surfaces of two structural members can be overlapped to form an interface, and the friction stir welding tool can be used to form a weld joint along the interface, thereby joining the structural members. In another embodiment, the workpiece can include a single structural member and the friction stir welding tool can be used to form a weld joint in the member, e.g., to repair a crack, hole, or other defect therein or to affect the material properties of the structural member. Friction stir welding has also been used to prepare T-joints, corner joints, fillet welds, hem joints, and other structural joints.

The workpiece may be formed of a variety of materials including, but not limited to, aluminum, aluminum alloys, titanium, titanium alloys, steel, copper, magnesium, magnesium alloys, ferrous alloys, and the like. Non-metal materials can also be welded with the friction stir welding tool, e.g., materials such as polymers and the like. When two or more workpieces are welded together, the materials for each may be the same or different.

The workpieces formed according to the present invention can be used in a variety of applications, including, for example, frames, panels, skins, airfoils, and the like for aeronautical and aerospace structures such as aircraft and spacecraft, for marine vehicles, automobiles, and the like, as well as for other applications outside of the transportation industry.

Figure 1:
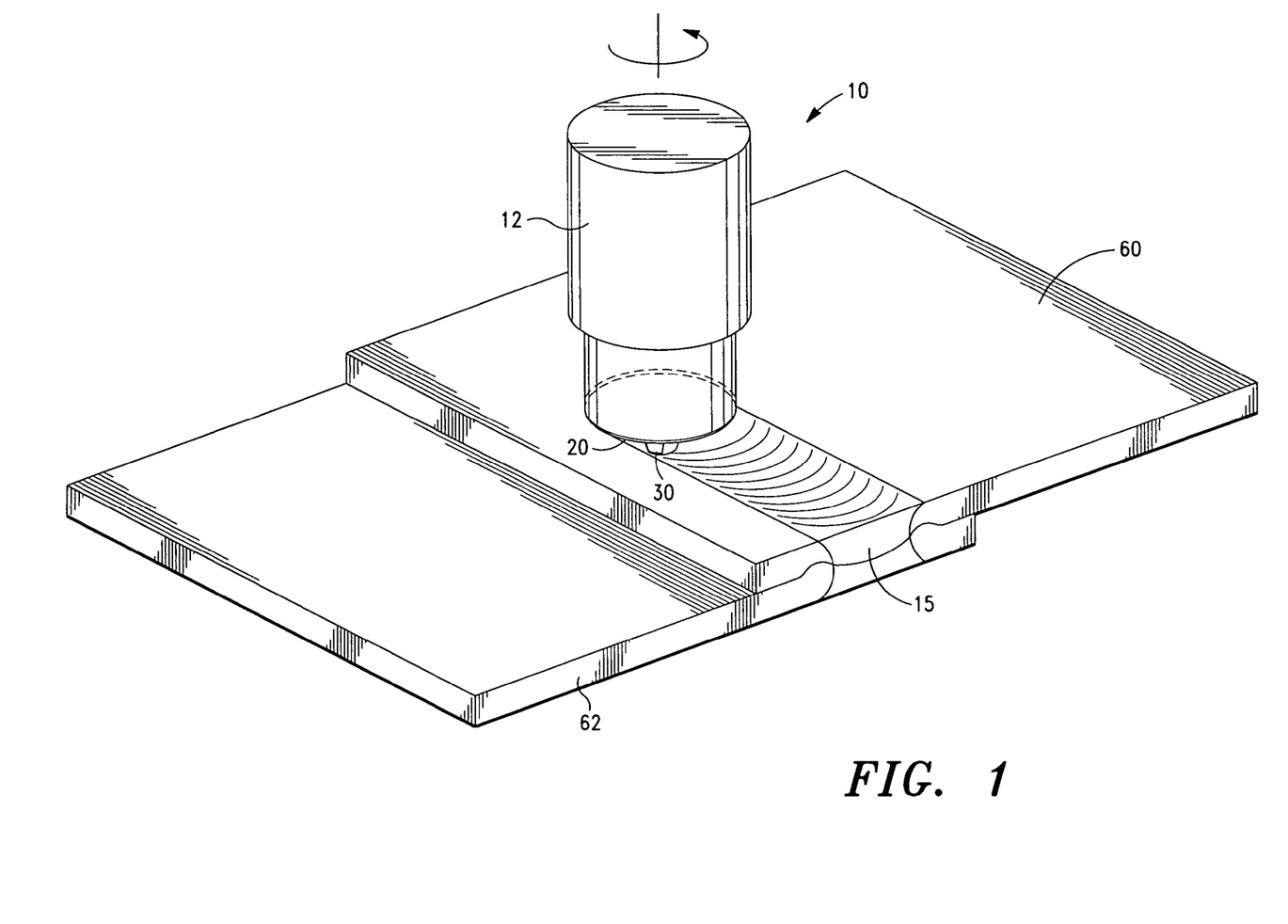
FIG. 1 is a perspective view of a friction stir welding tool in accordance with the invention, in which two workpieces are welded together to form a lap joint.
Figure 2:
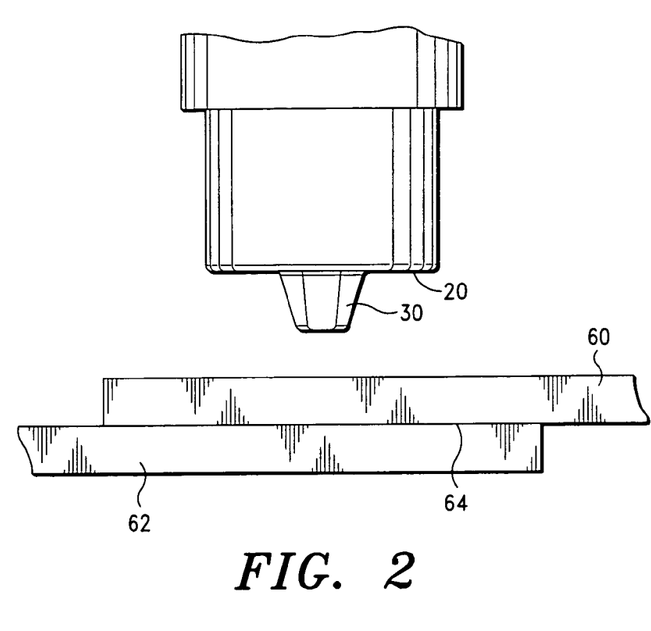
FIG. 2 is a side view of the friction stir welding tool used in FIG. 1.
Figure 3:
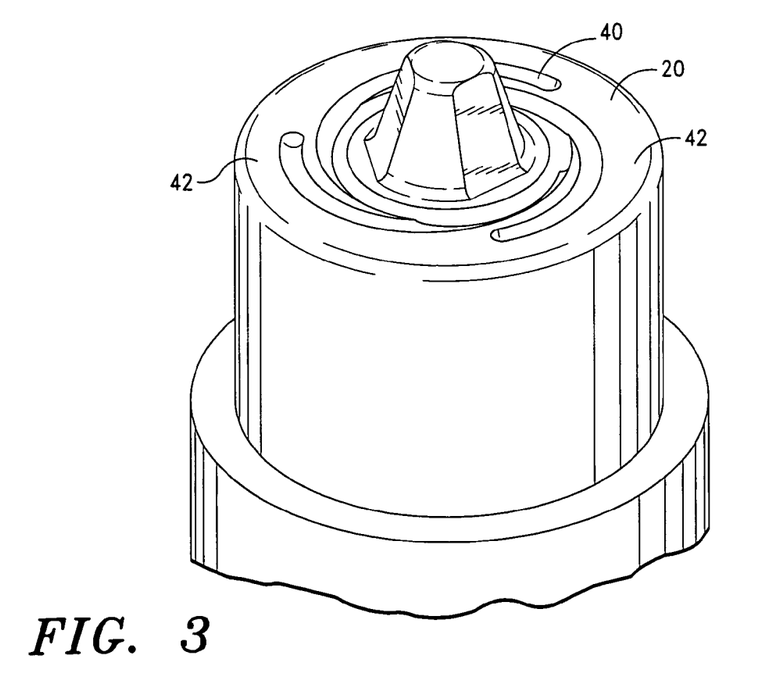
FIG. 3 is perspective view of the friction stir welding tool shown in FIG. 1.

Referring now to the drawings and, in particular, to FIGS. 1, 2, and 3, there is shown a friction stir welding tool 10 according to a first embodiment of the present invention. The tool 10 is used for friction stir welding workpieces 60, 62 together to form a lap joint 15 near the interface 64.

As illustrated in FIG. 2, the friction stir welding tool 10 includes a support body 12 rotable about an axis having a first shoulder section 20 and a pin 30. Typically, the support body 12 is circular in cross-section, and the pin 30 is centered therein to rotate about the axis. The first shoulder section 20 and pin 30 are preferably formed of a material having high strength and heat resistance. For purposes of example only and not limitation, the first shoulder section 20 and/or pin 30 are constructed of steel, a molybdenum alloy, or a nickel alloy.

Various pin configurations may be used in the friction stir welding tools of the present invention. For example, the pin may be cylindrical in shape, threaded, fluted, frustum-shaped, smooth or flat, and either have a flat or radiused end. The pin may optionally have ridges and/or grooves as set forth in Hempstead, U.S. Patent Application No. 2004/0035914, which is incorporated by reference.

The first shoulder section 20 is formed having a configuration to be applied against workpiece 60 to frictionally engage the workpiece 60. In the first embodiment, a generally flat first shoulder section 20 is provided. As discussed in alternate embodiments, it will be appreciated to those skilled in the friction stir welding art that the first shoulder 20 section may have any suitable shape, including being generally flat, tapered, convex, or concave. The shoulder section may optionally contain a chamfer at the outer edge as generally described in Thomas, U.S. Pat. No. 5,460,317, which is incorporated by reference.

As shown in FIG. 3, the first shoulder section 20 is provided with a scroll pattern 40. Exemplary scroll patterns include single or multiple logarithmic spirals, Archimedean spirals, Golden Section spirals, wobbly spirals, concentric grooves, and the like. The scroll patterns may also include grooves that are generally oblique to the spirals or grooves and extend in a generally radial direction relative to the pin.

In the present invention, the scroll pattern 40 terminates before the outer boundary of the first shoulder section 20. Thus, the first shoulder section 20 contains a concentric peripheral surface area 42 adjacent to the scroll pattern 40 that is free of scrolls. The presence of this scroll-free concentric peripheral surface area 42 promotes smoothing of the surface finish produced by the welding tool as it passes over the original surface of the workpiece 60. It is theorized that this scroll-free region functions as a "wiper" to wipe the workpiece(s) substantially clean of debris (or "flash") formed during the friction stir welding process and force the debris to the outside of the welding area or to contain the material within the shoulder region.

The extent to which the shoulder contains the scroll-free region may vary. For example, the scroll-free region in the shoulder section may comprise about 90, 80, 70, 60, 50, 40, 30, 20, 10, or 5% of the total surface area of the shoulder section. In another aspect, the scroll-free region comprises about 10-95%, 20-80%, 30-70%, or about 40 to 60% of the total surface area of the shoulder section. The remaining shoulder section thus contains no scroll pattern.

For example, a flat shoulder having a radius of 0.2 inches and a pin radius of 0.1 at the shoulder surface would have a total exposed shoulder surface area of $\pi*[(0.2 \text{ in})^2-(0.1 \text{ in})^2]$ or 0.094 square inches. Assuming the scroll pattern extends from the pin base out 0.05 inches, the surface area having a scroll pattern would be about $\pi*[(0.15)^2-(0.1)^2]$ or 0.039 square inches. As such, 0.039/0.094×100% or about 41% of the shoulder section has a scroll pattern, leaving about 59% of the shoulder section being scroll-free. This calculation is intended to illustrate an example as to how to quantify the scroll-free region and is not intended to be limiting.

Figure 4:
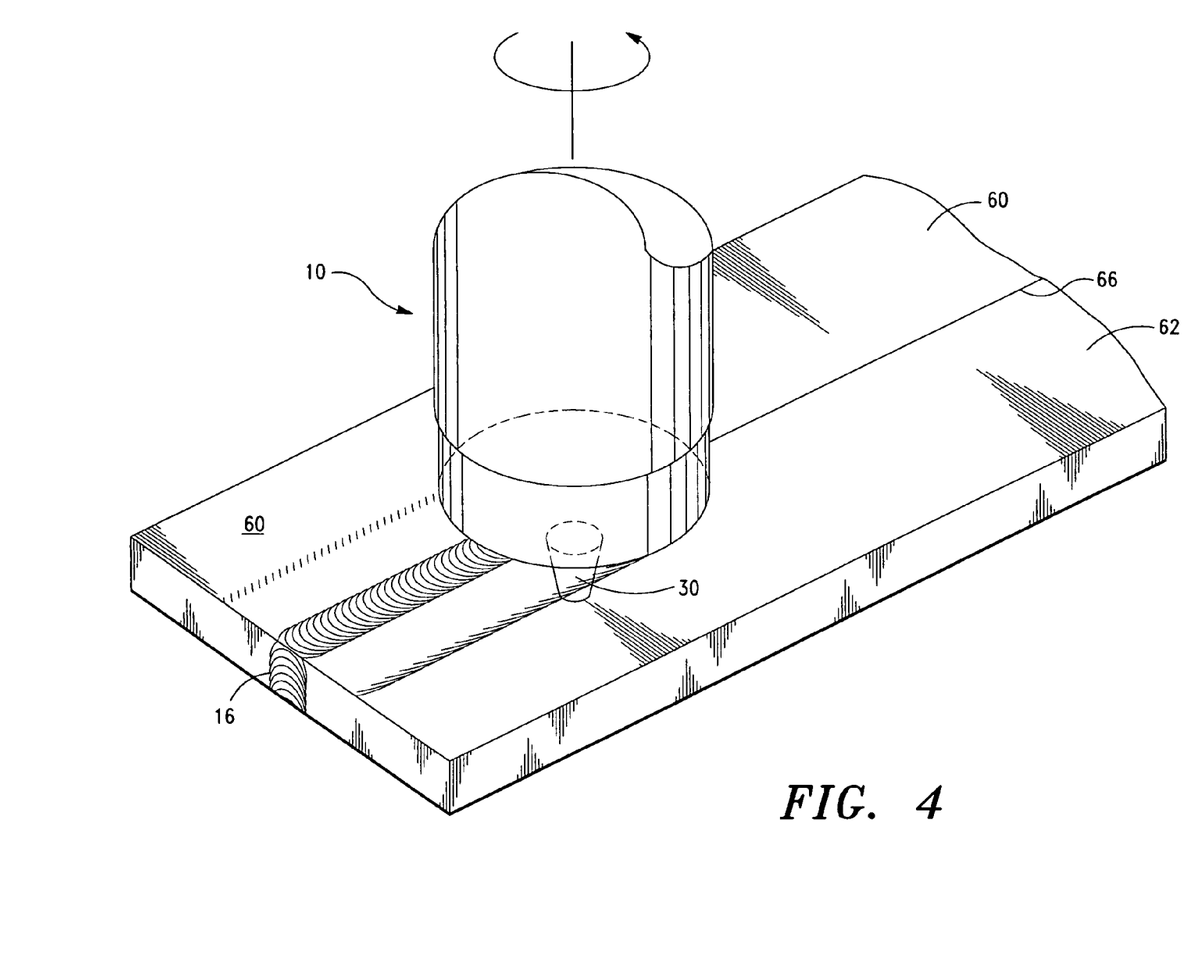
FIG. 4 is a perspective view of a friction stir welding tool in accordance with a second embodiment of the present invention, in which two workpieces are welded together to form a butt joint.
Figure 5:
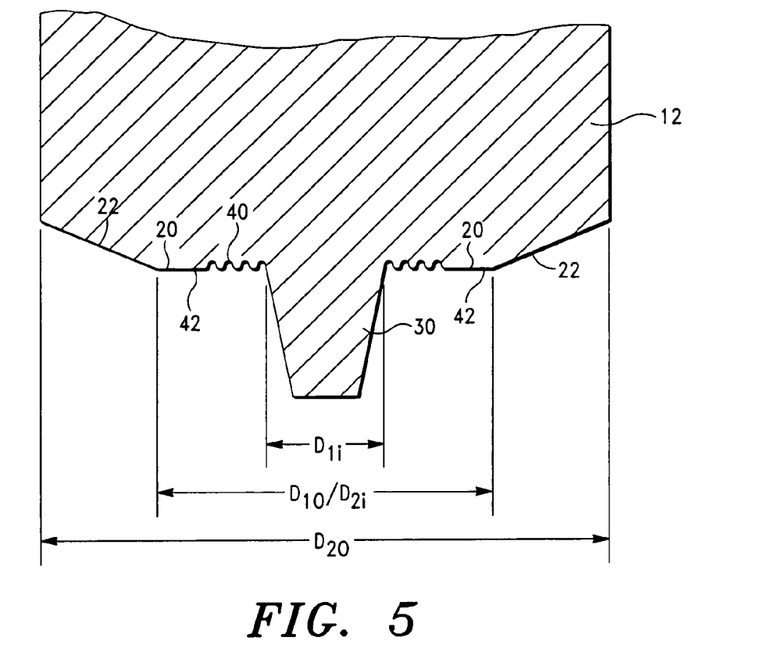
FIG. 5 is section view of the friction stir welding tool shown in FIG. 4, illustrating a scroll pattern terminating prior to the peripheral boundary of the shoulder section.
Figure 6:
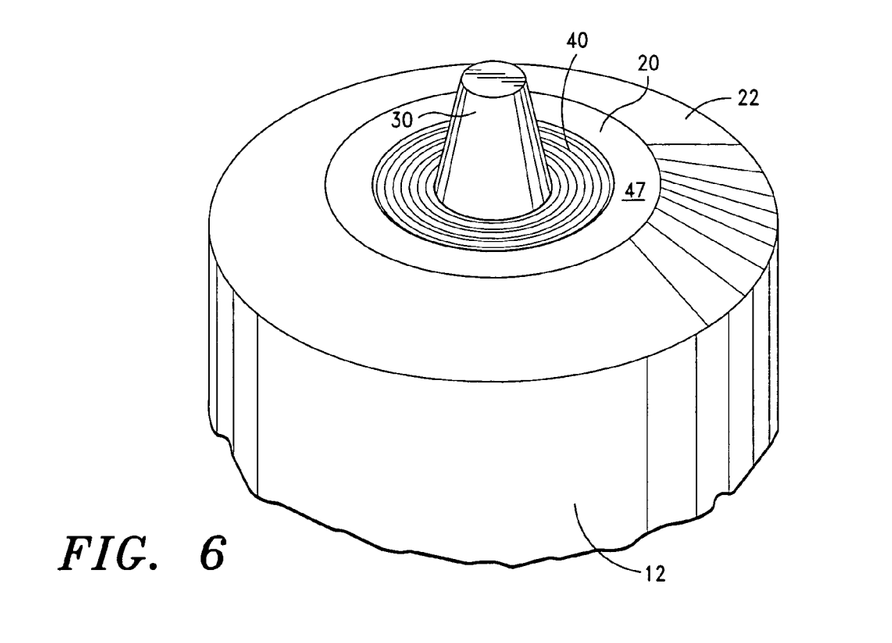
FIG. 6 is a perspective view of the friction stir welding tool shown in FIG. 4.

FIGS. 4, 5, and 6 illustrate a friction stir welding tool 10 in accordance with a second embodiment of the present invention. The tool 10 is used for friction stir welding workpieces 60, 62 to form a butt joint 16 near the interface 66.

As shown in FIG. 5, the friction stir welding tool 10 includes a plurality of shoulder sections 20, 22 and a pin 30. The first shoulder section 20 has an inner diameter $D_{1i}$ and outer diameter $D_{1o}$, and a first concentric shoulder surface residing therebetween. The second shoulder section 22 has an inner diameter $D_{2i}$ and outer diameter $D_{2o}$, and a second concentric shoulder surface residing there between. The shoulder sections are generally flat, tapered, convex, or concave. FIGS. 5 and 6 illustrate an exemplary shoulder in which the first shoulder section 20 is generally flat, while the second shoulder section 22 is tapered. Exemplary shoulder section configurations are also described in U.S. Pat. No. 6,669,075, which is incorporated by reference.

As shown in FIG. 5, at least one of the shoulder sections 20, 22 is provided with a scroll pattern. The scroll pattern preferably is contained in the first shoulder section 20 adjacent to or just slightly offset from the pin 30. In another aspect, each of the shoulder sections 20, 22 is provided with a scroll pattern 40. The scroll pattern in each shoulder section 20, 22 may be the same or different.

In the present invention, the scroll pattern terminates before the outer boundary of at least one of the shoulder sections having the scroll pattern. For example, as shown in FIG. 5, the first shoulder section 20 contains a concentric peripheral surface area 42 adjacent to the scroll pattern 40 that is free of scrolls. The scroll pattern 40 generally begins in the first shoulder section 20 at the inner diameter $D_{1i}$ and terminates prior to outer diameter $D_{1o}$, thereby creating an area adjacent outer diameter $D_{1o}$ that is scroll-free. The presence of this scroll-free concentric peripheral surface area promotes smoothing of the surface finish produced by the welding tool as it passes over the weld track.

Figure 7:
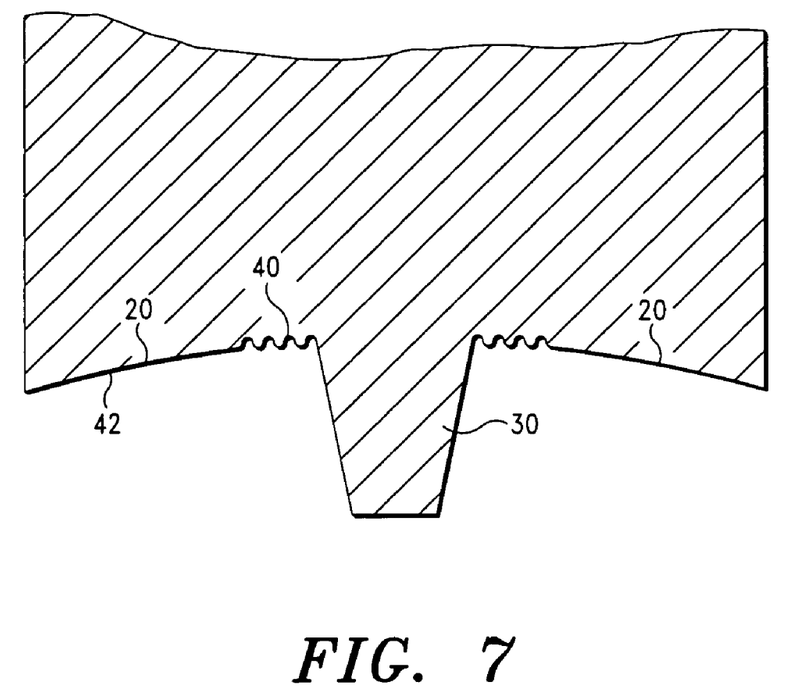
FIG. 7 is section view of the friction stir welding tool in accordance with a third embodiment of the present invention in which the scroll pattern terminates within a shoulder having a concave shape.

FIG. 7 shows cross-section a friction stir welding tool 10 in accordance with a third embodiment of the present invention. The tool can be used, for example, to form the lap and butt joints illustrated previously, as well as spot welding, friction stir processing and the like. The friction stir welding tool 10 includes first shoulder section 20 and a pin 30. The first shoulder section 20 is generally concave in shape.

As shown in FIG. 7, the first shoulder section 20 is provided with a scroll pattern 40. The scroll pattern 40 terminates before the outer boundary of the first shoulder section 20. Thus, the first shoulder section 20 contains a concentric peripheral surface area 42 adjacent to the scroll pattern 40 that is free of scrolls.

In still another embodiment, the welding tool may be constructed of more than one piece. For example, the shoulder sections may comprise separate sections that are held together using conventional techniques as described in FIG. 8 of U.S. Pat. No. 6,669,075. In essence, each section forms a concentric collar. In contrast to the '075 patent, however, in the present invention a scroll pattern in the shoulder section terminates prior to the peripheral boundary of shoulder section to form a scroll-free concentric region at the peripheral boundary of said shoulder section.

From the foregoing it will be seen that this invention is one well adapted to attain all ends and objectives herein above set forth, together with the other advantages which are obvious and which are inherent to the invention.

Example 1

Comparison of Welds

In this example, a conventional friction stir welding tool having scroll pattern comprising three spiraling scrolls extending from the central pin out to the terminal edge of a flat shoulder was compared to a tool in accordance with the present invention in which the scroll pattern terminated prior to the terminal edge.

More specifically, the tool comprised a support body with a radius of about 0.2 inches and a planar shoulder. The pin extending from the center of the shoulder had a radius at the shoulder face of about 0.075 inches and was tapered to a smaller diameter extending out from the shoulder at about a 10 degree angle from the centerline of the tool. The pin was about 0.115 inches long and was threaded with 40 threads per inch (40-UNJ) cut at the same taper of the pin (about 10 degrees from the tool centerline). Additionally, three equally spaced tapered flats (about 120 degrees apart) were milled at about 10 degrees from the tool centerline on the pin to a depth of about 0.010 inches. The shoulder included a scroll pattern comprising three spirals and an inner concentric circle. The 0.032 inch diameter spirals were started adjacent the pin about 120 degrees apart and were machined to a depth of about 0.016 inches. The spiral began at about 0.105 inches from the center of the shoulder. The spiral then spiraled outward for 0.3 revolutions. The radial progression was about 0.16 inches per 360 degrees. The shoulder section also contained a circular groove with a constant radius at the pin having a depth of about 0.016 inches. The resulting wiper was about 0.016 inches wide at its narrowest where the scrolls terminated. A comparative tool was prepared having the same dimensions except that the scroll pattern terminated at the peripheral edge of the shoulder.

Figures 8, 9:
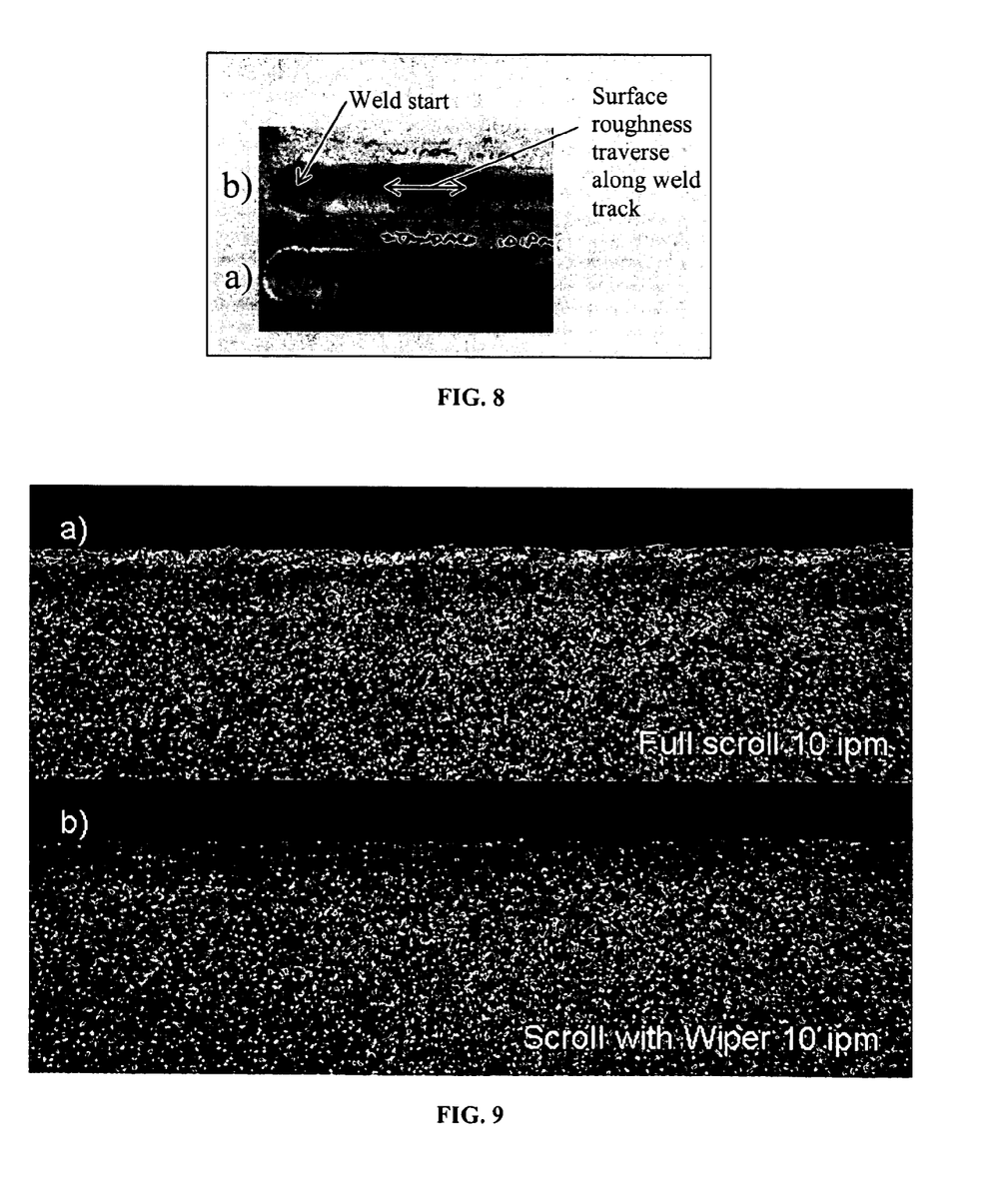
FIG. 8 is a photograph showing (a) a weld track produced by the weld tool of Example 1 using a conventional friction stir welding tool having a scroll pattern across the entire shoulder surface and (b) a weld track produced by the weld tool of Example 1 with a scroll-free peripheral concentric surface.
FIG. 9 is a photograph showing the longitudinal cross-sections of the welded joints of using (a) a conventional friction stir welding tool having a scroll pattern across the entire shoulder surface and (b) a friction stir welding tool having a scroll-free peripheral concentric surface as described in Example 1. The samples were etched with Kellers etch and the photographs are magnified 100 times. The abbreviation "ipm" refers to inches per minute.

FIGS. 8 and 9 illustrate the weld tracks for the comparative and inventive tool. The welds were run at a spindle speed of 800 rpm, and a tool travel speed of ten (10) inches per minute at the same forge force. The surface roughness of the two weld tracks was measured using a Mitutoyo profilometer. The average surface roughness (n=4) from the conventional tool was 104 Ra. The average surface roughness (n=4) from the tool containing the inventive scroll-free peripheral region was 59 Ra. As shown in the figures, the weld track made using the conventional tool revealed a greater extent of shearing and a greater surface roughening than the weld made using the tool in accordance with the present invention.

Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A tool for forming a friction stir weld joint or friction stir processing a workpiece, the tool comprising:
    a support body including a shoulder and a pin that are concentric and rotatable about a first axis, wherein said pin extends from said shoulder parallel with the first axis, and wherein said shoulder comprises a flat planar face that is concentric about the first axis, and extends from said pin and terminates at a peripheral boundary of said flat planar face; and
    a scroll pattern in said flat planar face of said shoulder, said scroll pattern extending from said pin and terminating prior to said peripheral boundary of said flat planar face to define a peripheral scroll-free concentric region on said flat planar face of said shoulder, said scroll-free concentric region being concentric about the first axis, and extending from said scroll pattern and terminating at said peripheral boundary of said flat planar face, said scroll-free concentric region comprising at least 5% of the total surface area of said flat planar face of said shoulder, and
    wherein said scroll pattern comprises a plurality of spiral formed grooves each of which spirals outward for less than a full revolution around said flat planar face.

2. The tool of claim 1 wherein said scroll-free concentric region comprises about 45% to 65% of the total surface area of said flat planar face of said shoulder.

3. The tool of claim 1 wherein said scroll-free concentric region comprises about 5% to 40% of the total surface area of said flat planar face of said shoulder.

4. The tool of claim 1 wherein said scroll pattern has a uniform depth.

5. The tool of claim 1 wherein said shoulder further comprises a chamfer that extends from said peripheral boundary of said flat planar face and terminates at a peripheral boundary of said shoulder.

* * * * *

UNITED STATES PATENT AND TRADEMARK OFFICE
CERTIFICATE OF CORRECTION

| | | |
|---|---|---|
| PATENT NO. | : 8,016,179 B2 | |
| APPLICATION NO. | : 11/487814 | |
| DATED | : September 13, 2011 | |
| INVENTOR(S) | : Burford | |

It is certified that error appears in the above-identified patent and that said Letters Patent is hereby corrected as shown below:

<u>Column 2,</u>

Line 5, "centric" should read --concentric--;

Line 14, "tools" should read --tool--;

Line 20, "a shoulder section" should read --a tapered shoulder section--.

<u>Column 3,</u>

Line 4, "accordance with the invention" should read --accordance with the present invention--.

Signed and Sealed this
Thirteenth Day of December, 2011

David J. Kappos
*Director of the United States Patent and Trademark Office*